(No Model.) 3 Sheets—Sheet 1.
L. LUDGIN.
COMBINED BOOK HOLDER AND READING STAND.
No. 510,075. Patented Dec. 5, 1893.
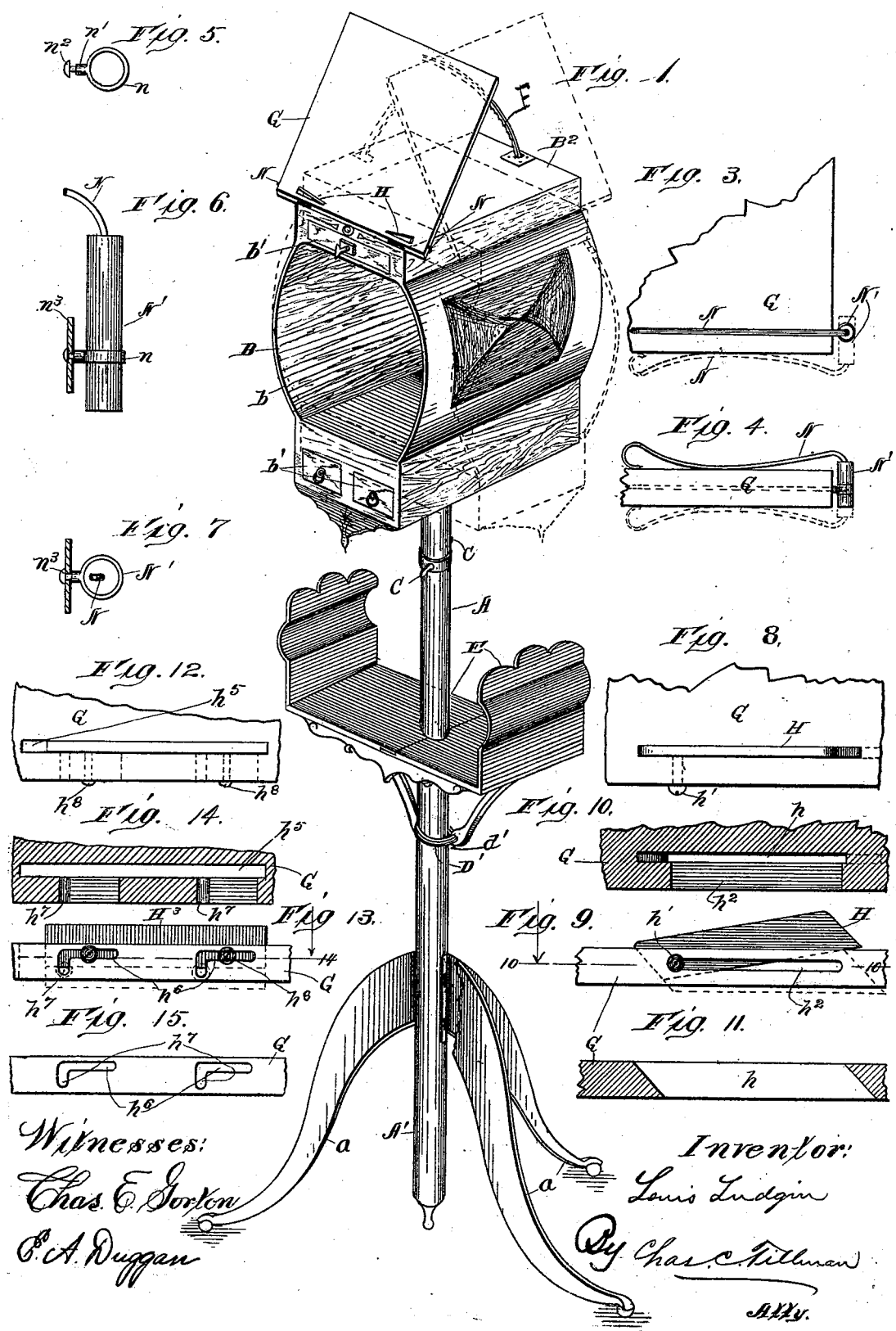

(No Model.) 3 Sheets—Sheet 2.
L. LUDGIN.
COMBINED BOOK HOLDER AND READING STAND.
No. 510,075. Patented Dec. 5, 1893.
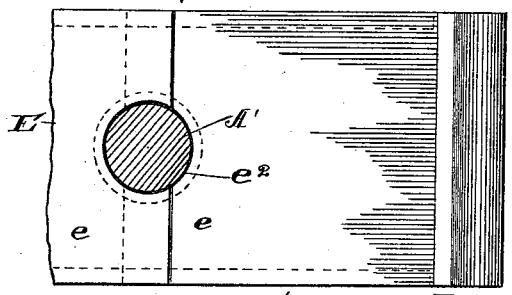
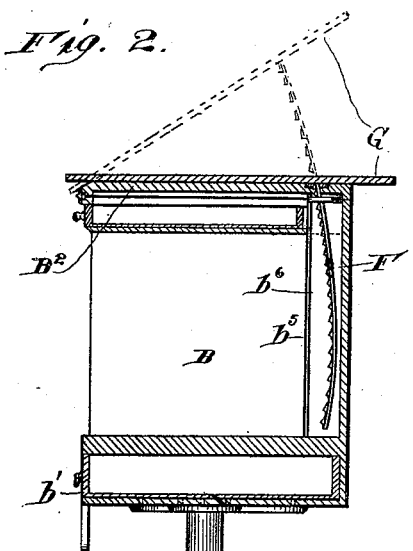
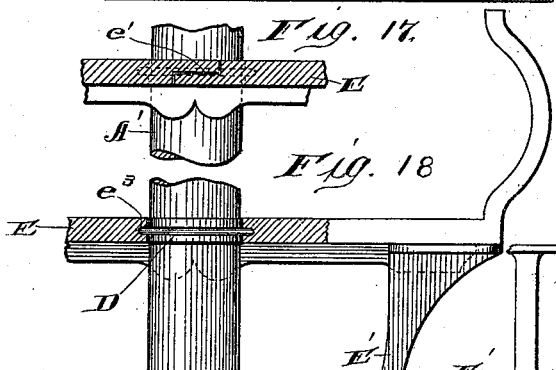
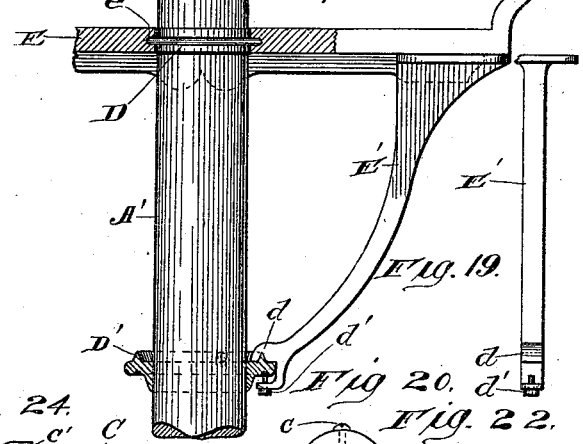
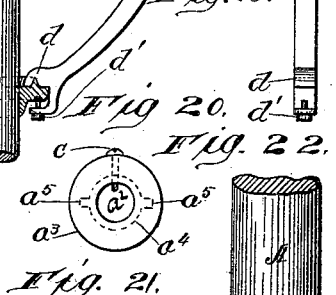
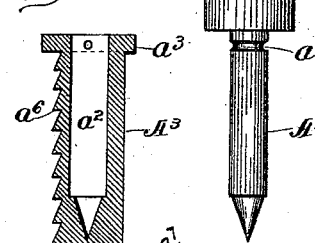
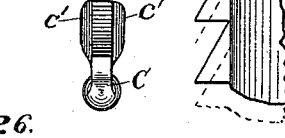
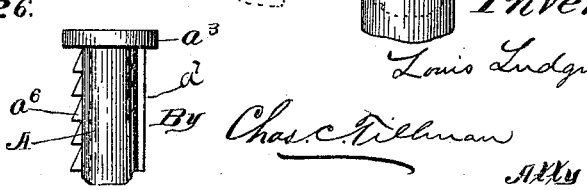
Witnesses:
Chas. E. Gorton.
P. A. Duggan.
Inventor:
Louis Ludgin.
By Chas. C. Tillman
Atty (No Model.)  3 Sheets—Sheet 3.
L. LUDGIN.
COMBINED BOOK HOLDER AND READING STAND.
No. 510,075. Patented Dec. 5, 1893.
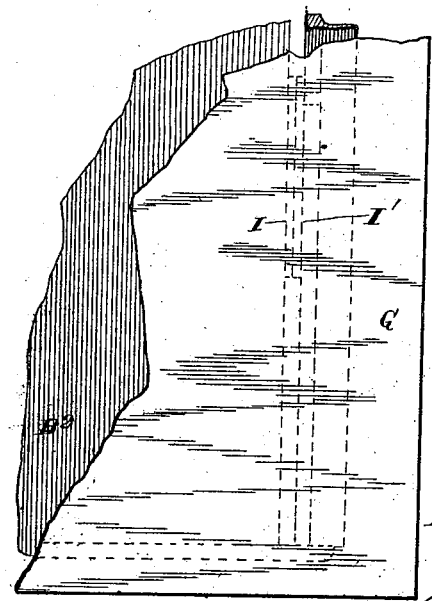
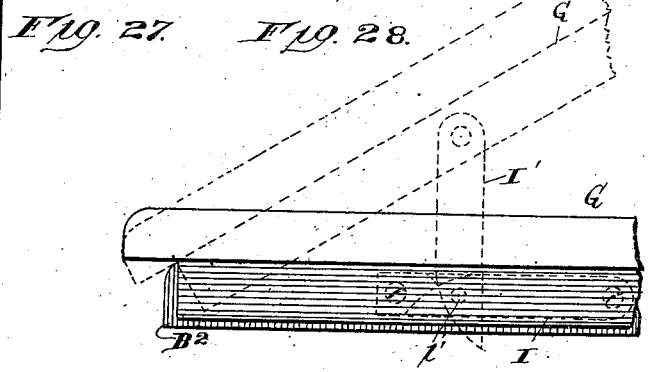
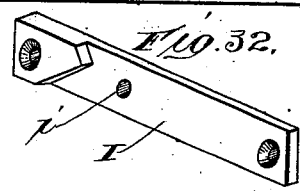
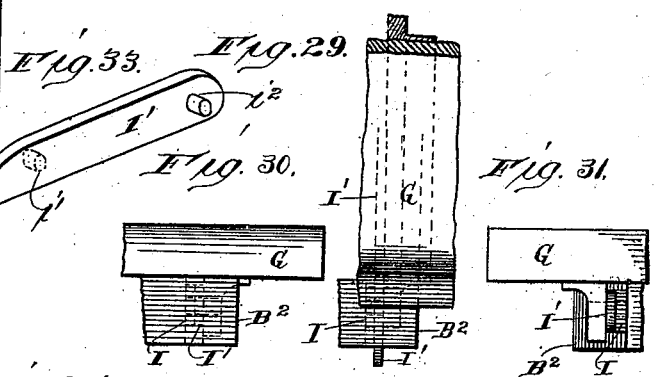
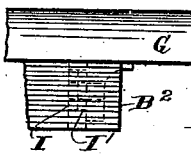
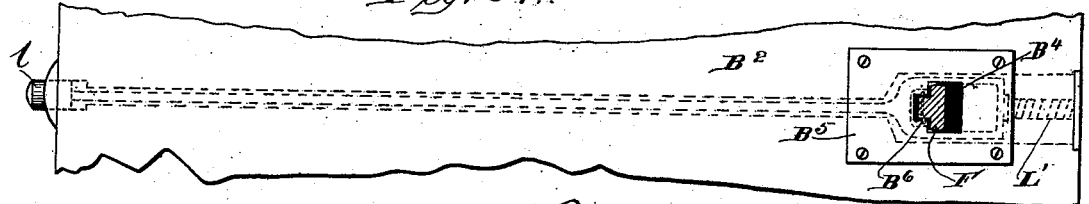
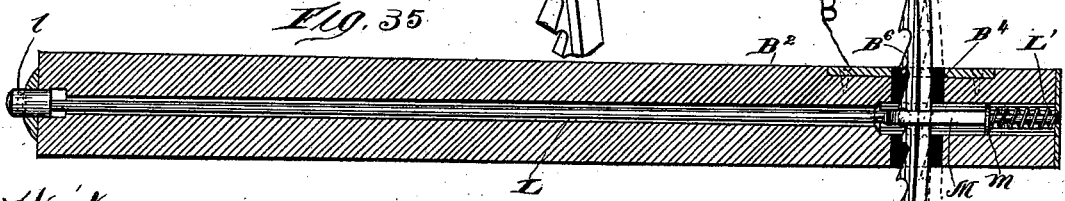
Witnesses
Chas. E. Gorton
R. A. Duggan
Inventor:
Louis Ludgin
By Chas. C. Tillman
Atty

UNITED STATES PATENT OFFICE.

LOUIS LUDGIN, OF CHICAGO, ILLINOIS.

COMBINED BOOK-HOLDER AND READING-STAND.

SPECIFICATION forming part of Letters Patent No. 510,075, dated December 5, 1893.

Application filed March 7, 1893. Serial No. 465,001. (No model.)

*To all whom it may concern:*

Be it known that I, LOUIS LUDGIN, a citizen of the United States, residing at Chicago, in the county of Cook and State of Illinois, have invented certain new and useful Improvements in a Combined Book-Holder and Reading-Stand, of which the following is a specification.

This invention relates to improvements in a combined book-holder and reading-stand, and consists in certain peculiarities of the construction, novel arrangement and operation of the various parts thereof, as will be hereinafter more fully set forth and specifically claimed.

The objects of my invention are first, to provide an attractive piece of furniture for the holding of a book or books, which will occupy a small amount of space, and can be readily converted into a reading-stand, or table for a lamp or other purposes; and second, such a device upon which a book may be placed at any desired angle, and raised or lowered or turned to any required point to suit the reader or user.

In order to enable others skilled in the art, to which my invention pertains to make and use the same, I will now proceed to describe it, referring to the accompanying drawings, in which—

Figure 1, is a perspective view of my invention, as it appears when ready for use. Fig. 2, is a vertical sectional view thereof, showing fragments of the supporting legs, and one of the same disconnected from the standard or upright post. Fig. 3, is a plan view of a portion of the adjustable lid or top, showing the leaf-holder connected thereto. Fig. 4, is a view in front elevation thereof. Fig. 5, is a detail view of the swivel-ring for securing the leaf-holder to the lid. Fig. 6, is a detail view of a portion of the leaf-holder or spring, showing its swivel and plate for securing it to the lid. Fig. 7, is a plan sectional view thereof. Fig. 8, is a plan view of a portion of the adjustable lid, showing its book-rest or stop in position. Fig. 9, is a view in front elevation thereof. Fig. 10, is a plan sectional view of Fig. 9, taken on line 10, 10, with the check or stop removed. Fig. 11, is a horizontal sectional view of a portion of the adjustable lid, showing the mortise or recess within which the check or stop operates. Figs. 12, 13, 14, and 15, are views which correspond respectively, to Figs. 8, 9, 10, and 11, of a modification of the book-check or stop which may sometimes be used. Fig. 16, is a plan view of a portion of the revoluble shelf, Fig. 17, is a view partly in section of a portion of said shelf, and a part of the supporting standard or upright post. Fig. 18, is a view in side elevation, partly in section, of a portion of the supporting standard, the revolving shelf, one of its supporting brackets, and track for the same. Fig. 19, is a detail view in front elevation, of one of the supporting brackets detached from the shelf and track. Fig. 20, is a plan view of a portion of the supporting standard, and its ratchet-toothed swivel-socket. Fig. 21, is a sectional view of the socket-piece, and a portion of the supporting standard. Fig. 22, is a detail view of a part of the upper portion of the supporting standard and its pivot or swivel-pin. Fig. 23, is a fragmental view in side elevation of a portion of the ratchet-toothed socket, showing it engaging with its operating pawl. Fig. 24, is a plan view of the pawl detached. Fig. 25, is a rear end view of the same. Fig. 26, is a view in side elevation of the upper part of the ratchet-toothed socket. Fig. 27, is a fragmental plan view of a portion of the adjustable lid, and a part of the top of the stand or table, showing in dotted lines, the two hinged together. Fig. 28, is a view of a portion of the adjustable lid, and the top of the stand or table, illustrating the manner in which the adjustable lid may be raised or lowered to any desired angle. Fig. 29, is a front view partly in section, of a portion of the adjustable lid, and the top of the stand or table showing the lid partly raised. Fig. 30, is a front view of a portion of the adjustable lid, and top of the stand or table, showing the lid lowered. Fig. 31, is a rear view thereof. Figs. 32, and 33, are detail perspective views of parts of the hinge for the adjustable lid. Fig. 34, is a fragmental plan view of a portion of the top of the stand or table, showing the guide and locking-plate for the adjusting rod of the adjustable lid, and the spring-actuated-operating rod therefor. Fig. 35, is a horizontal sectional view thereof, showing a portion of the adjusting rod in position. Fig. 36, is a detail perspective view of a portion of the operating-rod. Fig. 37, is a perspective view of a portion of the adjusting rod or ratchet for the lid, and Fig. 38, is a perspective view of the guide and locking-plate detached.

Similar letters refer to like parts throughout the different views of the drawings.

A, and A', represent the upper and lower portions, respectively, of the supporting standard or upright post, to which is secured at its lower part in any desired manner a number of supporting legs $a$.

To the top of the part A, is secured a book-holder B, which may be of any desired size, form and construction, but usually of the form illustrated in Fig. 1, in which the sides $b$, thereof, are slightly bowed or outwardly curved, in order to allow the dictionary, Bible, or other book, which is designed to rest within the holder B, to be more easily grasped or taken hold of.

In the upper and lower parts of the holder B, may be located drawers $b'$, for the reception of various articles, such as paper, pens, and pencils. The lower portion of the part A, of the supporting standard, is formed or provided with a swivel or pivot-pin $A^2$, which is preferably made cone-shaped at its end, and is provided at its upper part with an annular groove $a'$, for engagement with a set-screw $c$, which is located in the upper part of the ratchet-toothed-swivel-piece $A^3$, which is as shown in Figs. 20 and 21, formed with a socket or opening $a^2$, for the reception of the swivel or pivot-pin $A^2$, and at its top with an annular flange or rim $a^3$, to rest on the upper portion of the part A', of the supporting standard.

The upper portion of the part A', of the supporting standard is formed with a hollow or socket $a^4$, which socket or hollow is provided with vertical grooves $a^5$, located diametrically opposite to each other, as shown in Fig. 20, one of which grooves is for the reception of the ratchet-teeth $a^6$, on the socket-piece $A^3$, and the other groove for the reception of a vertical or longitudinal projection $a^7$, on said piece opposite the teeth.

Near its upper end the part A', of the supporting standard is provided with a bearing for the pawl C, which engages with the ratchet-teeth $a^6$, and by means of which the upper part A, may be raised or lowered and retained at any suitable point.

As is clearly seen in Figs. 24 and 25, the pawl C, is provided with shoulders $c'$, which rest against the surface of the part A', by reason of the weight on the engaging end of the pawl, and lock the same in a horizontal position.

By reference to the drawings, it will be seen and readily understood, that the swivel or pivot-pin $A^2$, is placed within the socket $a^2$, of the piece $A^3$, and may be there retained by means of the set-screw $c$, which engages in the groove $a'$, when the parts will assume the position shown in Fig. 2, after which the book-holder or the piece A, may be revolved or raised and retained at any position by means of the pawl. At a suitable point near its upper part and on its outer surface, the piece A', is provided with an annular flange or rim D, and beneath this rim with an annular track D', which are for the support of the shelf E, and its supporting brackets E'.

As is clearly seen in Figs. 16, 17, and 18, the shelf E, is made of two pieces $e$, which are tenoned together, as at $e'$, and are provided on their inner ends with an opening $e^2$, to fit around the piece A'. The pieces $e$, forming the shelf E, are also provided with an annular groove $e^3$, within which fits and operates the rim or flange D.

To each end of the shelf E, is secured a depending bracket E', which has its lower portion horizontally bifurcated, the upper portion of which bifurcation is formed with a depression or recess $d$, to engage with the track D', while the lower part thereof, is provided with a set-screw $d'$, to engage the lower surface of the track, and to retain the bracket thereon. It will therefore be seen and understood that the shelf is revoluble on the standard, and that it is supported at its center by means of the rim D, and at its ends by means of the brackets.

In Fig. 2, I have shown a sectional view of the book-holder B, which as before stated may be of any suitable size and construction. In the present instance I have shown it substantially rectangular in form, and provided at its rear part with a vertical partition $b^5$, which forms a recess $b^6$, between it and the rear side of the holder, for the reception and operation of the ratchet-toothed-rod F, which is suitably connected at its upper end to the lower surface of the adjustable lid G, which is hinged to and rests on and slightly over the top $B^2$, of the book-holder. The front part of the lid G, near its edge is provided with one or more checks or stops H, upon which the book may rest, and be prevented from sliding off when the lid G, is raised.

The check or stop consists of a block or piece H, having its ends cut diagonally and parallel one with the other, as shown in Fig. 9, and operates in a vertical slot $h$, formed in the lid G, near its front edge, which slot also has its ends formed diagonally and parallel one with the other, as is illustrated in Fig. 11.

To the outer surface of the block or piece H, is secured a pin or screw $h'$, which passes through and operates in a horizontal slot $h^2$, in the board or lid G.

When it is desired to use the stop or check, the piece H, is raised through the slot $h$, and placed in the position indicated by continuous lines in Fig. 9, when it is apparent that said piece will extend slightly above the upper surface of the lid G, and when not in use that its pin $h'$, may be moved to the other end of the slot $h^2$, and the piece H, turned over, when it will fit snugly within the slot $h$, and its upper surface will be flush with the adjustable lid.

In Figs. 12, 13, 14, and 15, I have shown a modification of the stop or check, in which the lid G, is provided with a vertical slot $h^5$, and with two horizontal slots $h^6$, which are formed as shown in Fig. 13, with off-sets or depressions $h^7$. In this modification instead of using a piece with diagonally formed ends, I use a rectangular piece $H^3$, which is provided with two pins or screws $h^8$, which fit and operate in the slots $h^6$.

When it is desired to use the piece $h^3$, as a stop, it is only necessary to raise its pins from the depressions $h^7$, and to slide them in the slots $h^6$, when the piece $h^3$, will project slightly above the upper surface of the lid G, as is apparent. When it is desired to dispense with their use the opposite movement is made, and the said pieces will be flush with the surface of the adjustable lid.

To each side of the top $B^2$, of the book-holder is secured a plate I, which is formed with an opening or bearing $i$, for a pin $i'$, on the side of the piece I', which piece has near its outer end a pin $i^2$, to engage with the lid G, as is shown by dotted lines in Fig. 28. The rear portion of the top $B^2$, of the book-holder is formed with a vertical opening $B^4$, through and in which passes and operates the ratchet-toothed-rod F.

To the upper surface of the top $B^2$, and over the opening $B^4$, is secured a guide and locking-plate $B^5$, the opening of which is provided with a catch-piece $B^6$, which engages the teeth on the ratchet-rod F, as is shown in Fig. 35, and may be liberated therefrom by means of the spring-actuated rod L, which extends from the front of the top $B^2$, to its rear and is provided at its rear end with a spring L', which spring encircles a portion of said rod, and rests against and between the shoulder $m$, on the rod and the outer surface of the top. At a point below the opening in the plate $B^5$, the rod L, is provided with an enlargement or frame M, through the opening of which the ratchet-rod F, passes.

When it is desired to liberate the ratchet-teeth from the catch $B^6$, it is only necessary to press the button $l$, on the end of the rod L, which operation forces the front part of the frame M, against the rod F, and presses the latter back and from the catch-piece $B^6$, when the lid, to which the rod F, is secured, may be raised to any desired angle and the rod L, will be forced back to its normal position by means of the spring L', which movement causes the rear part of the frame M, to impinge against the rod F, and presses it forward into engagement with the catch on the locking-plate.

To each side of the lid G, and near its front corners, is secured a leaf-holder, which consists of a spring or piece of wire N, having one of its ends secured to a tube N', around which is secured a ring or band $n$, which is provided with a collar $n'$, within which fits a pin $n^2$, which passes through a plate $n^3$, which is secured to the lid G, by means of screws or otherwise, thus affording a swivel connection for the leaf-holder or spring N, which, when not in use, may be turned to the positions indicated by dotted lines in Figs. 3 and 4, when it will be out of the way.

Having thus fully described my invention, what I claim as new, and desire to secure by Letters Patent, is—

1. The combination of a supporting standard or post, with a book-holder mounted on its top, an annular rim and track on the supporting standard beneath the book-holder, a shelf provided at its middle with an opening to receive the standard, and an annular groove for the rim, and having secured to its ends supporting brackets, said brackets being bifurcated at their lower ends and having grooves and set-screws to engage the track, substantially as described.

2. The combination of a supporting standard or post, with the book-holder B, having the adjustable lid G, provided with book-check or stops, and leaf-holders, the annular rim D, and track D', located on the standard below the book-holder, the shelf E, having an opening to receive the standard and an annular groove for the rim, brackets E', secured to the ends of the shelf, and having the grooves $d$, and set-screws $d'$, to engage the track, substantially as described.

3. The combination of a supporting standard or post composed of the part A, having on its upper end a book-holder or stand, and at its lower end the pivot or swivel-pin $A^2$, and the part A', having in its upper end the socket $a^4$, and at its lower end the legs $a$, with the socket piece $A^3$, having the socket $a^2$, for the pin $A^2$, and the ratchet-teeth $a^6$, and adapted to operate in the socket $a^4$, the pawl C, to engage the teeth $a^6$, the rim D, and track D', located on the standard, the shelf E, having the opening $e^2$, to receive the standard and annular groove $e^3$, for the rim, the brackets E', having the grooves $d$, and set-screws $d'$, to engage the track, substantially as described.

4. The combination of the supporting standard or post composed of the part A, having on its upper end the book-holder B, and at its lower end the pin $A^2$, and the part A', having in its upper end the socket $a^4$, and at its lower end the legs $a$, with the book-holder B, having the adjustable lid G, provided with book check or stops, the socket-piece $A^3$, having the socket $a^2$, for the pin $A^2$, and the ratchet-teeth $a^6$, and adapted to operate in the socket $a^4$, the pawl C, to engage the teeth $a^6$, the rim D, and track D', on the standard, the shelf E, having the opening $e^2$, to receive the standard and annular groove $e^3$, for the rim, the brackets E', having the grooves $d$, and set-screws $d'$, to engage the track, substantially as described.

5. The combination with a supporting standard or post, of the book-holder B, having the top $B^2$, provided with the opening $B^4$, and the locking and guide-plate $B^5$, having the catch $B^6$, the spring-actuated rod L, having the frame M, the adjustable lid G, having the book-check or stops, the ratchet-rod F, secured to said lid and adapted to operate in the opening $B^4$, and to engage the catch $B^6$, and to be disengaged therefrom by the rod L, substantially as set forth.

6. The combination with a supporting standard or post, of the book-holder B, having the top $B^2$, provided with the opening $B^4$, and the guide-plate $B^5$, having the catch $B^6$, the spring-actuated-rod L, having the frame M, the adjustable lid G, having the book-check or stops H, and the leaf-holders, the plates I, secured to the top $B^2$, and the pieces I′, secured at their upper ends to the lid G, and engaging at their other end with the plate I, and hinging the lid G, and top $B^2$, together, the ratchet-rod F, secured to said lid, and adapted to operate in the opening $B^4$, and to engage the catch $B^6$, and to be disengaged therefrom by the rod L, substantially as set forth.

7. The combination with a supporting standard or post, of the book-holder B, having the top $B^2$, provided with the opening $B^4$, and the guide-plate $B^5$, having the catch $B^6$, the spring-actuated-rod L, having the frame M, the adjustable lid G, hinged to the top $B^2$, the ratchet-rod F, secured to the lid G, and adapted to operate in the opening $B^4$, and to engage the catch $B^6$, and to be disengaged therefrom by the rod L, substantially as described.

8. The combination with a supporting standard or post, having the annular rim D, and track D′, with a shelf E, having an opening $e^2$, for the standard and an annular groove $e^3$, for the rim, the brackets E′, having the grooves d, and set-screws d′, to engage the track, substantially as described.

9. The combination with a supporting standard or post of a book-holder or stand mounted thereon, and the adjustable lid G, hinged thereto, said lid having the slots h, and $h^2$, the former having its ends beveled, the piece H, having its ends beveled, and its pin h′, adapted to operate in the slot $h^2$, substantially as described.

LOUIS LUDGIN.

Witnesses:
CHAS. C. TILLMAN,
E. A. DUGGAN.